Dec. 9, 1969   H. J. FAY   3,482,850
COLLAPSIBLE AUTOMOBILE TRAILER
Filed Aug 22, 1968   5 Sheets-Sheet 1
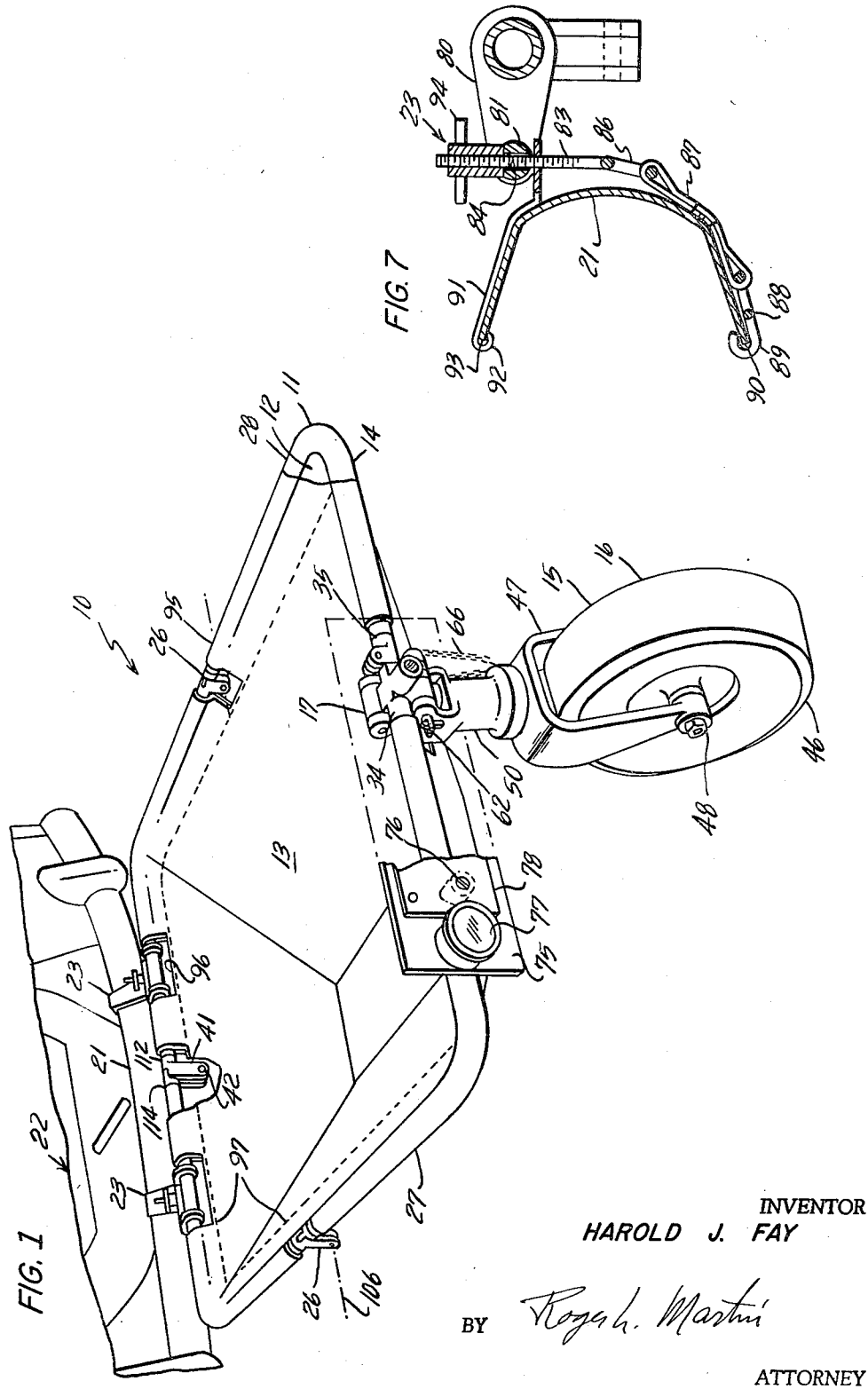
INVENTOR
HAROLD J. FAY
BY Roger L. Martin
ATTORNEY

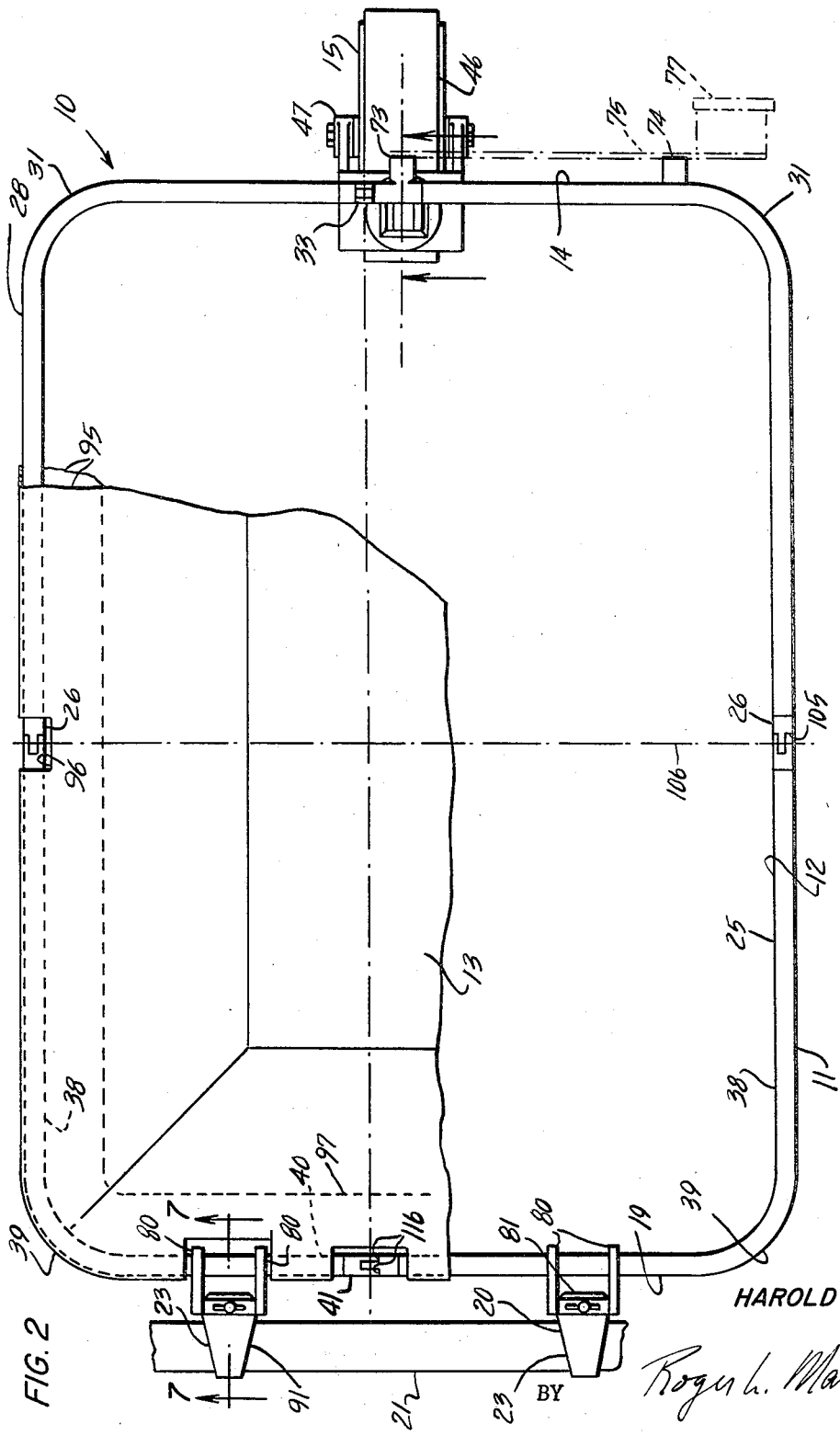

Dec. 9, 1969     H. J. FAY     3,482,850
COLLAPSIBLE AUTOMOBILE TRAILER
Filed Aug 22, 1968     5 Sheets-Sheet 3
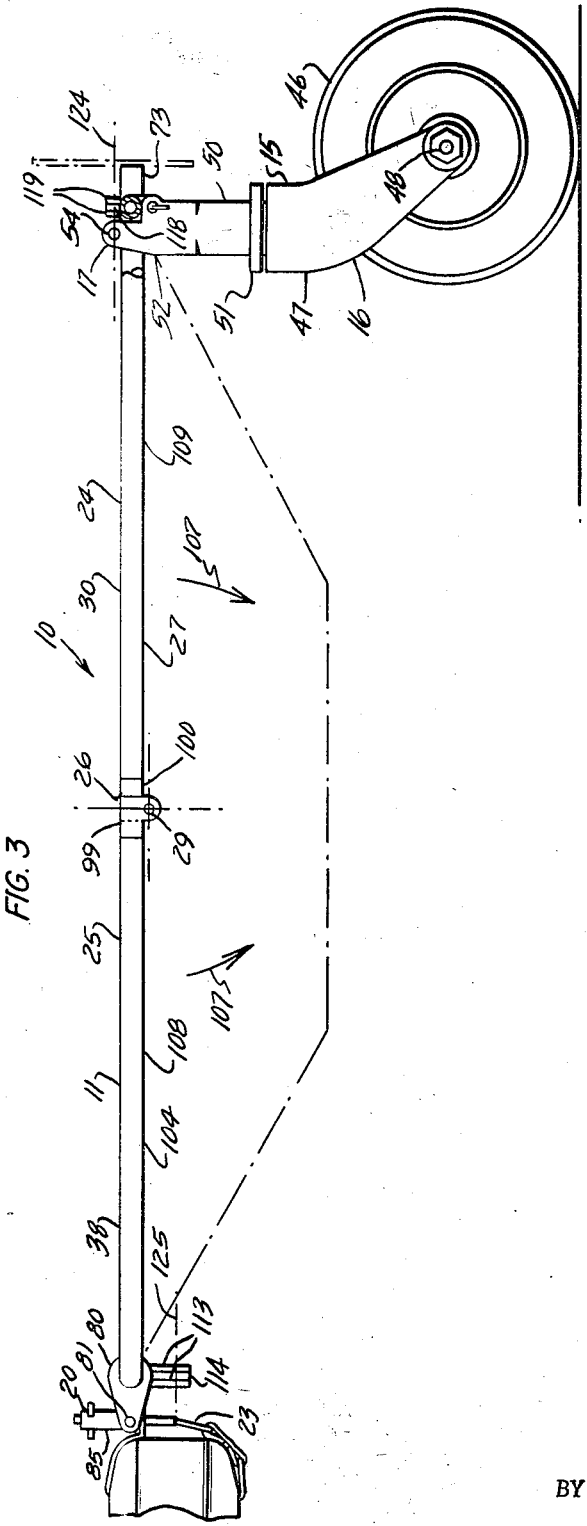
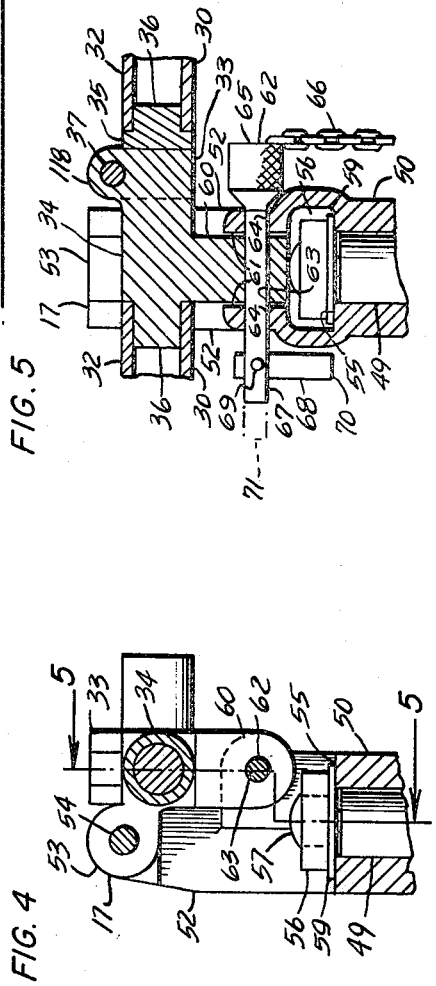
INVENTOR
HAROLD J. FAY
BY *Roger L. Martin*
ATTORNEY Dec. 9, 1969  H. J. FAY  3,482,850
COLLAPSIBLE AUTOMOBILE TRAILER
Filed Aug 22, 1968  5 Sheets-Sheet 4
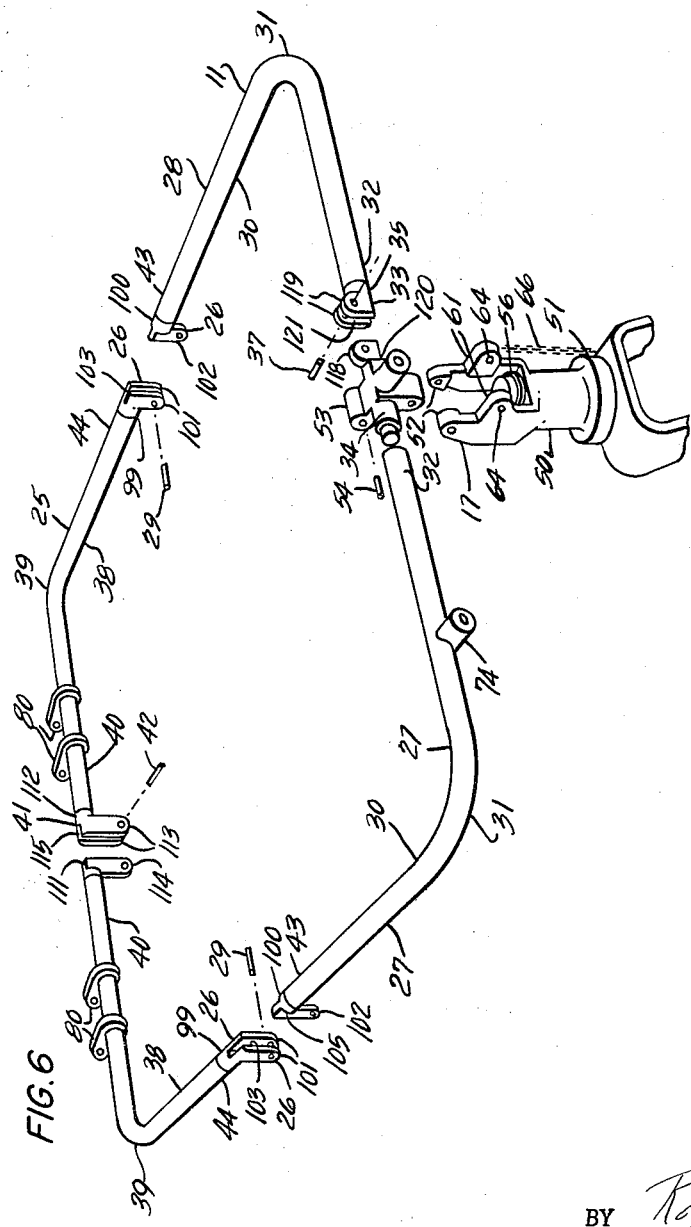
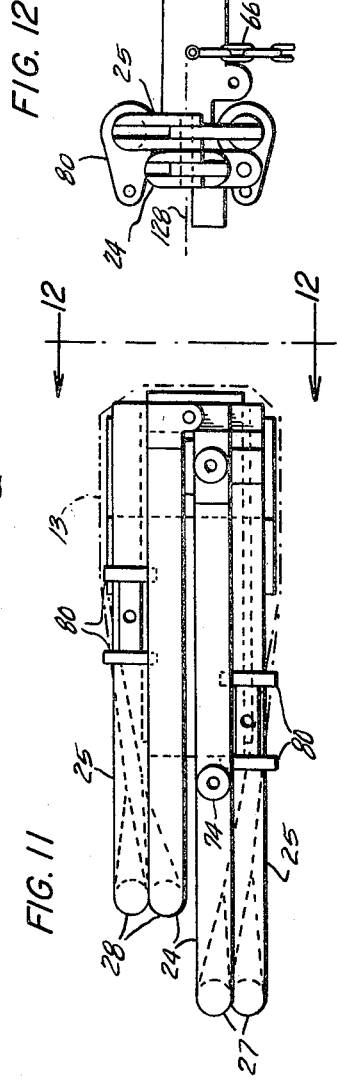
INVENTOR
HAROLD J. FAY
BY Roger L. Martin
ATTORNEY

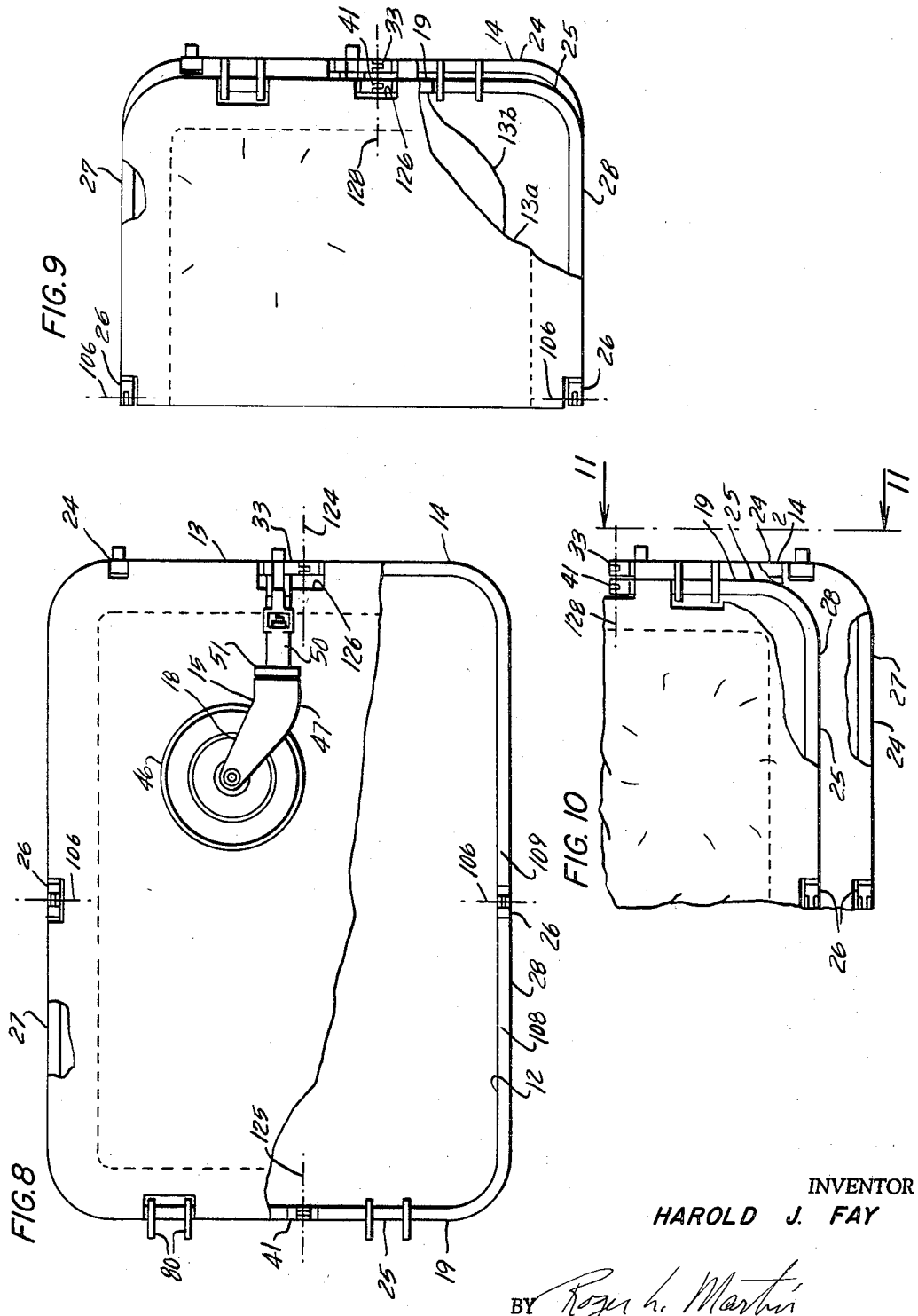

United States Patent Office 3,482,850
Patented Dec. 9, 1969

3,482,850
COLLAPSIBLE AUTOMOBILE TRAILER
Harold J. Fay, P.O. Box 302, Windermere, Fla. 32786
Filed Aug. 22, 1968, Ser. No. 754,696
Int. Cl. B62d 21/14, 61/00
U.S. Cl. 280—41                                  8 Claims

ABSTRACT OF THE DISCLOSURE

A collapsible one wheel trailer for automobiles has a flexible load bearing support which is suspended in the opening of an open foldable frame to which a caster wheel assembly is pivotally connected for movement between a frame supporting position at which the assembly is suitably locked and a collapsed position in the frame opening for storage purposes. The trailer is portable and the frame has a hinge arrangement for interconnecting its structural components and which enables the wheel assembly to be generally enclosed by the flexible support when the frame is folded.

The invention relates to a one wheel trailer for automobiles and more particularly to a trailer which can be collapsed into a relatively small space for storage during nonuse.

Many of the smaller, so called "compact," automobiles lack adequate storage space for luggage and the like and this inadequacy makes such automobiles less acceptable for use by the modern day highway traveler. To overcome the lack of storage space, the traveler frequently resorts to equipping the vehicle with exteriorly mounted luggage racks which tend to cause an undue rise in the center of the gravity of the vehicle when the rack is loaded. This, of course, increases the danger of tipping or rolling the vehicle over under driving conditions.

Automobile trailers have, of course, been used in the past for carrying luggage and the like and in lieu of using luggage racks. Most of the current day trailers, however, are too heavy to be satisfactorily pulled behind the so-called "compact" automobiles. One object of the invention is to provide a light weight trailer for compact automobiles which avoids the need for equipping such vehicles with luggage racks or the like and which in addition to this is so constructed as to be collapsed into a relatively small, compact package that enables the trailer to be stowed in the trunk or other storage compartment provided in such vehicles.

One particular object of the invention is to provide a one wheel trailer which is inexpensive to manufacture and which is made from light weight components which are so connected in the trailer structure as to enable the trailer to be collapsed into a relatively small space for storage purposes.

Yet another object of the invention is to provide a chassis or frame for a collapsible trailer and where the structural components of the frame are interconnected mainly by hinges that are so arranged when the frame is unfolded and attached to a vehicle as to generally avoid the need for locking devices which, but for the arrangement of the hinges, would normally be needed to prevent pivotal movement of the components.

Yet a further object of the invention is to provide a frame structure for suspending a flexible load bearing component in a one wheel collapsible trailer and wherein the wheel when the trailer is collapsed is substantially enclosed by the load bearing component and thus inaccessible for contact during the handling of the collapsed trailer so as to avoid the rubbing off of dirt and other matter which accumulates on the wheel assembly during the road use of the trailer.

In accord with one aspect of the invention an elongated open frame or chassis is provided in the trailer structure for suspending a flexible load bearing component in the frame opening and a caster wheel assembly is connected to the frame by means which permits the assembly to be moved from a frame supporting position at which it is locked during use to another position for storage purposes and at which the assembly is generally located in the open part of the frame.

Yet another aspect of the invention is directed to providing a foldable frame or chasses structure which includes opposing sections that are pivotally interconnected so that the frame can be folded to a point at which the sections are in face-to-face relation and to further providing suitable means which enable the respective sections to also be folded.

Other aspects of the invention relate to a hinge arrangement for connecting the structural components of the frame and which enables the wheel assembly in its collapsed position to be housed in contact with the bottom face of the load bearing flexible component of the trailer.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a perspective view of a one wheel trailer embodying the principles of the invention as seen when attached to the rear bumper of a road vehicle and with certain parts broken away.

FIG. 2 is a top plan view of the trailer seen in FIG. 1 with certain parts removed and others broken away.

FIG. 3 is a left side elevational view of the trailer with certain parts broken away and others removed.

FIG. 4 is a section view in elevation along the lines 4—4 of FIG. 2 and illustrates the means used for connecting the wheel assembly to the frame.

FIG. 5 is another elevational sectional view of the fragment seen in FIG. 4 and is generally taken along the lines 5—5 therein.

FIG. 6 is an exploded view of the principal parts of the trailer frame or chassis and certain parts involved in connecting the wheel assembly to the frame.

FIG. 7 is a vertical section view through one component of the bumper hitch as seen along the lines 7—7 of FIG. 2.

FIG. 8 is a bottom plan view of the trailer as seen in one stage in the process of collapsing the trailer with certain parts removed and others broken away.

FIG. 9 is a view at a more advanced stage in the process of collapsing the trailer with certain parts removed and others broken away.

FIG. 10 is yet another view showing the trailer as fully collapsed with certain parts removed and others broken away.

FIG. 11 is a view taken generally along the lines 11—11 of FIG. 10 with certain parts removed and others broken away.

FIG. 12 is a view taken generally along the lines 12—12 of FIG 11 with certain parts removed and others broken away.

Reference is now made to the drawings and wherein a one wheel trailer embodying the principles of the invention is generally designated in the drawings by the numeral 10. The trailer includes an elongated foldable frame or chassis 11 which is made up of elongated structural components that are suitably interconnected by hinges in an endless arrangement that provides a central opening 12 in the frame. In the opening 12, the trailer has a flexible sheetlike component 13 which is suspended from the frame so as to provide the load supporting component for the trailer. The flexible sheet 13 may be made from woven fibrous material or a continuous flexible sheet of suitable plastic material or the like.

During use, the frame is generally oriented in a horizontal plane that is evident from FIGS. 1 and 3 and is supported at the rear end 14 of the frame by a caster or swivel wheel assembly designated at 15. This assembly 15 is shown as locked in its frame supporting position 16 in FIGS. 1 through 3 inclusive and is hinged to the frame by hinge 17 so as to be pivotally movable into the opening 12 of the frame when it comes time to collapse the trailer for storage purposes. The front end 19 of the frame is equipped with a hitch 20 for connecting the frame to the bumper 21 of an automobile 22 and this hitch 20 includes a pair of transversely spaced components 23 which will be subsequently described in more detail.

The frame 11, as previously indicated, is foldable and includes a pair of U-shaped and foldable frame sections, designated at 24 and 25 respectively. During use of the trailer these sections are generally arranged in a coplanar relation such as is evident from FIGS. 1 through 3 inclusive. Sections 24 and 25 are interconnected by a pair of hinges 26 that are located at the opposite sides 27 and 28 of the frame. These hinges are equipped with transversely aligned pivot elements 29 which provide an axis for pivotally moving the sections 24 and 25 into face-to-face relation when the frame is being folded for storage purposes and as will be described in more detail subsequently.

Section 24 is generally located at the rear end 14 of the frame and includes a pair of elongated structural components which are appropriately bent to form the rear corners 31 at the opposite sides of the elongated frame. The components 30 are generally arranged in end to ends 32 of the components 30, and these legs 34 and 35 1 and 6 and here the adjacent ends 32 are fixed to and interconnected by the rear hinge 33 of frame 11. The opposite legs 34 and 35 of hinge 33 have end portions, designated at 36, which fit in the hollows at the adjacent ends 32 of the components 30, and these legs 34 and 35 are interconnected by a pivot element 37 which provides an axis for pivotally moving the structural components 30 so that the rear section 24 can be also folded.

The front section 25 also has a pair of elongated structural components 38. These components 38 are also bent so as to form the opposite corners 39 at the front end of the frame. The adjacent ends 40 of sections 38 are fixed to and interconnected at the front end 19 of the frame by another hinge, designated at 41. Hinge 41 has a pivot element 42 which also provides an axis for pivotal movement of these components 38 of the frame, and the arrangement enables the front section to also be folded when the need arises to collapse and stow the trailer.

The opposite ends 43 and 44 of the structural components 30 and 38 respectively are remote from the hinge connected ends at the front and rear ends of the frame and are arranged in end to end relation at the opposite sides of the frame and whereat they are fixed to and interconnected by the side hinges 26.

The wheel assembly 15 includes a road wheel 36 which is mounted on a bifurcated fork or yoke forming component 47 for rotation about the axis of a bolt type fastener 48. The fork 47 has a swivel pin 49, and pin 49 is journaled in a cylindrical pin housing 50 which is equipped at its lower end with a bearing plate 51 that is bearingly supported on the yoke or fork component 47. Housing 50 has a pair of spaced lugs 52 that are cast integral with the pin housing 50 and which extend upwardly as seen in FIGS. 4 and 5 to straddle the opposite ends of a cylindrical boss 53 which is cast integral with leg 34 of hinge 33 and located at the inside of the frame as seen in FIGS. 4, 5 and 6. These lugs 52 form components of hinge 17, and the wheel assembly 15 is pivotally connected to the rear section 24 by a pin 54 which connects the lugs 52 with the boss 53 and establishes a transverse axis for pivotal movement of the assembly 15 with respect to the frame.

The lugs 52, as previously indicated, are spaced apart in an arrangement which provides a shoulder 55 at the upper end of the pin housing 50. Here the swivel pin 49 is retained in the assembly by a cylindrical retainer 56 that is secured to the end of the swivel pin 49 by an axially arranged screw element 57 which threadably engages the end of the pin 49. Retainer 56 forms a component of a swivel pin retaining assembly that has a washer like element 59 which is interposed between the shoulder 55 and the retainer component 56. Element 59 is made from spring steel and is warped so as to constantly maintain the yoke 47 in contact with the bearing plate 51. This spring type loading of the retainer assembly prevents so called "wheel wobbling" when the trailer is being drawn behind the vehicle and is of conventional design well known to those skilled in the art.

Hinge 33 has another boss 60 and which is also cast integral with the left leg 34 of the hinge. This boss 60 is located at the bottom of the hinge leg 34, and the lugs 52 are formed with a pair of spaced rearwardly projecting ears 61 which straddle the opposite ends of the boss when the wheel assembly 15 is in the frame supporting position 16. During use, the wheel assembly is locked in the frame supporting position by a pin 62 which extends through a hole 63 in boss 60 and through appropriate holes 64 in the lug ears 61. Pin 62 has a knurled head 65 and is appropriately connected to the housing 50 by a flexible chain arrangement designated at 66 so as to prevent loss of the pin 62 when it is removed from the assembly. The pin 62 has a shank which is bifurcated at one end 67 and here the pin 62 is equipped with a small rectangular element 68 which is pin connected with bifurcation by a transverse pin 69 for movement between a transverse position designated at 70 and another position shown in broken lines 71 in FIG. 5. In the latter position, the element is longitudinally aligned with the axis of the pin. When element 68 is in the transverse position 70 it, of course, prevents withdrawal of the pin 62 through the aligned holes 63 and 64, when the element is in position 71 however, the pin can be withdrawn from its locking position in the aligned holes. By engaging the ears in the boss in the aligned holes 63 and 64, pin 62, of course, serves to lock the wheel assembly in the frame supporting position. To release the wheel assembly for pivotal movement to its collapsed position 18, one merely has to withdraw the pin from the holes 63 and 64 as will be readily apparent.

The left leg 34 of hinge 33 has a cylindrical protuberance 73 which is cast integral with the leg and which extends rearwardly as seen in FIG. 3. Offset from the protuberance 73 and welded to the left side structural component 30 of section 24 is yet another protuberance 74 which projects rearwardly of the frame. These protuberances 73 and 74 are spaced apart and provide a convenient place to mount a rectangular plate 75 and which is fastened to the protuberances 73 and 74 by threaded fasteners 76. Plate 75 serves as a mounting plate for an appropriate stop light 77 and for the license plate 78.

The hitch 20, as previously indicated, has separate components 23 which are spaced apart and located at opposite sides of the front hinge 41. Each component has a pair of lugs 80 that are spaced apart and welded to the adjacent tubular component 38 of section 25 so that the lugs project forwardly at the front end 19 of the frame. The hitch component has a pin 81 which is journaled at its opposite ends in appropriately aligned holes 82 in the lugs, and pin 81, as seen in FIG. 7, has a threaded element 83 which is axially slidable in a transverse aperture 84 in the pin 81. The upper end of element 83 carries a nut component 85 which bears against a flat surface in the upper side of the transverse pin 81 and the lower end of the threaded element 83 is equipped with an eye component 86. This eye component 86 is engaged by one end of a flexible strap 87. The other end of the flexible strap 87 engages the eye-component ears 88 of a hook 89 that is adapted to hook onto the lower edge 90 of bumper 21. Element 83 carries a rigid metal strap 91 between the eye component 86 and the bottom of pin 81 and this strap has a hook end 92 which is adapted to fit over the upper edge of bumper 21. The nut 85 has a pair of radially extending fingers 94 which are manipulatable to rotate the nut and thus draw the hook 89 and strap 91 into secure engagement with the bumper 21 so that the component is securely connected to the bumper. The fingers 94, of course, are also manipulatable to rotate the nut on the screw element 83 so that the hitch component can be released from the bumper.

Along the perimenter of the flexible sheet 13 for supporting the load carried by the trailer, the edge portions 95 are wrapped around the structural components 30 and 38 and secured at the underside of the sheet along a seam line, generally indicated at 97. Appropriate cut outs 96 are provided to accommodate the locations of lugs 80 and the various hinge components which interconnect the components 30 and 38 in the endless structural arrangement in the frame.

Each side hinge 26 has a pair of legs 99 and 100 which are fixed in the adjacent ends 44 and 43 of the structural components 38 and 30, respectively. Leg 99 is equipped with a pair of spaced depending ears 101 and leg 100 has a depending tongue 102 which fits in the space between the ears 101 and whereat the components 99 and 100 are interconnected by a pivot element 29 that extends through the ears 101 and intervening tongue 102 at the bottom 104 of the frame. Leg 100 is adapted to provide shoulders 105 on either side of the tongue 102 and when the frame is unfolded the ears 101 abut the shoulders and the tongue 102 bears against the base of the groove 103. The pivot pins 29 of the side hinges are aligned transversely at the bottom 104 of the frame and the tongue and groove arangement in the hinges 26 is such when the frame is unfolded as to limit pivotal movement of the frame sections about the transverse axis 106 provided by the aligned pivot elements to the directions indicated by arrows 107. Consequently when the frame is folded by relatively pivotally moving the sections about the axis 106, the bottoms 108 and 109 of sections 25 and 24 respectively can be brought into face-to-face relation.

The opposite legs 111 and 112 of the front hinge 41 also provide a tongue and groove arrangement, with leg 112 being provided with a pair of depending ears 113 which are spaced to provide a groove 115 therebetween and with leg 111 being provided with a depending tongue 114 that is adapted to fit into the groove 115. The tongue 114 is pivotally connected to the depending ears 113 by a pivot pin 42 and the arrangement is similar to the side hinges in that leg 111 has a pair of shoulders 116 against which the ears abut while the tongue engages the base of the groove 115 when the frame is fully unfolded.

The rear hinge 33 also has a tongue and groove arrangement but in this case the left leg 34 of the hinge has a tongue 118 which is upstanding and received between a pair of upstanding ears 119 of the right leg 35. Leg 34 also has a pair of shoulders at the opposite sides of the tongue 118 and when the frame is fully unfolded, the ears 119 abut the shoulders whereas the tongue 118 abuts the base end of the groove 121 provided between the ears 119 on leg 35. The tongue 118 and ears 119 are pivotally connected at the top 123 of the frame by pivot element 37. Element 37 establishes an axis 124 for folding the rear section 24, and pivot element 42 establishes as previously indicated, an axis 125 for folding the front section 25 of the frame. These axes 124 and 125, as best seen in FIG. 3, are parallel but nevertheless offset when the frame is unfolded, but the arrangement is nevertheless such that when the sections 24 and 25 are pivotally moved into the bottom face-to-face relation, the axes 124 and 125 become aligned so that the frame sections 24 and 25 can then be folded together.

The process of collapsing the trailer into a small compact package is illustrated in FIGS. 8 through 12 inclusive. In FIG. 8 the trailer is detached from the vehicle and inverted so as to be seen in bottom plan view with the frame 11 fully unfolded and the wheel assembly 15 in a collapsed position 18 in the opening 12 of the frame. To collapse the wheel assembly 15, pin 62, of course, is removed from engagement with the ears 61 and boss 60 and then pivoted from its frame supporting position 16 to the collapsed position designated at 18. At this point in the process of collapsing the trailer, section 24 can be pivotally moved about the axis 106 established by the aligned pins 29 of the side hinges 26 and brought into a position at which the bottoms 108 and 109 of sections 25 and 24 are in face-to-face relation as seen in FIG. 9.

Sheet 13, of course, is adapted and arranged to fold along the transverse pivot axis 106 as the sections, 24 and 25, are brought into face-to-face relation. Therefore, as this happens with the wheel assembly 15 in its collapsed position 18, the assembly 15 becomes housed at the bottom side of the sheet 13 between the end folds, 13a and 13b, which result from folding the sheet. Now the side hinges 26 are slightly closer to the front end 19 of the frame than to the rear end 14, and the ear 113 and tongue 114 arrangement for the front hinge 41 is such that these components project through the cut out 126 in sheet 13 for the rear hinge 33 sufficiently far enough to bring the pins 42 and 37 into alignment and coaxial arrangement at the top side 127 of the rear section 24 when the sections 24 and 25 are pivoted into face-to-face relation. This coaxial arrangement is designated by the numeral 128. Once this coaxial arrangement of pins 37 and 42 has been attained, sections 24 and 25 may be simultaneously folded about the axis 128 as indicated in FIG. 10 and whereat the trailer is shown in a fully collapsed position.

Hinges 33 and 41 are slightly closer to the right side 28 of the frame than to the left side 27 so as to accommodate a central location for the wheel assembly at the rear end of the frame. Consequently the sides 27 and 28 of the frame are generally offset in the fully collapsed trailer, as generally seen in FIG. 11.

From the foregoing description it will be apparent that the trailer, once collapsed, forms a compact package which can be readily stored in a minimum amount of space and that the wheel assembly is housed in the folds of the flexible sheet and at the underside of the sheet so that dirt and other foreign matter which adheres to the wheel assembly and underside of the sheet is more or less enclosed in the package and away from contact by the handler of the trailer. It will also be noted that, by virtue of the unique arrangement of the hinges, that separate means for locking the respective hinges when the trailer is unfolded is avoided.

While only certain preferred embodiments of this invention have been shown and described by way of illustration, many modifications will occur to those skilled in the art and it is, therefore, desired that it be understood that it is herein desired to cover all such modifications as fall within the true spirit and scope of this invention.

What is claimed as new and what it is desired to secure by Letters Patent of the United States is:

1. A collapsible automobile trailer comprising an elongated open frame which has opposite ends and which is generally oriented in a horizontal plane, a caster wheel assembly connected to the frame in a frame supporting position at one of said opposite ends, pivot means connecting the assembly with the frame and providing an axis for pivotal movement of the assembly between its frame supporting position and another position in the opening of the frame, releasable means locking the wheel assembly in its frame supporting position, hitch means at the other of said opposite ends for connecting the frame to an automobile, and flexible means suspended from the frame in the opening thereof for supporting a load on the trailer; said frame being foldable and including a pair of frame sections and hinge means which interconnect the sections and provide an axis for pivotal movement of the sections into face-to-face relation; and said flexible means being foldable and being adapted and arranged when the wheel assembly is in its other position and the frame sections are in said face-to-face relation to house the wheel assembly between folds thereof.

2. A collapsible automobile trailer in accord with claim 1 where each of said sections is foldable and has a pair of structural components, and a hinge component that interconnects the structural components and includes pivot means having an axis which is offset from the axis of the pivot means associated with the other of the sections when the frame sections are in coplanar relation and which is aligned with the axis of the pivot means associated with the other of the sections when the sections are in said face-to-face relation.

3. A collapsible automobile trailer comprising an elongated, generally rectangular, open frame which has opposite ends and opposite sides and which is generally oriented in a horizontal plane, said frame including a pair of foldable frame sections arranged in the plane in general coplanar relation and respectively located at said opposite ends, and a pair of hinges which respectively interconnect said frame sections at said opposite sides, said hinges having pivot means in transverse alignment at the bottom of the frame to provide an axis for pivotal movement of the sections into bottom face-to-face relation; said trailer further comprising a caster wheel assembly connected to the frame in a frame supporting position at one of said opposite ends, hitch means at the other of said opposite ends for connecting the frame to an automobile, and flexible means suspended from the frame in the opening thereof for supporting a load on the trailer; each of said sections including a pair of elongated structural components having adjacent ends located at the frame end associated with the section and spaced ends which are remote from the adjacent ends and secured to the respective hinges, and a hinge component which interconnects the structural components at their adjacent ends and has a pivot element providing an axis for pivotal movement of the structural components to fold the section associated therewith, the axis of said pivot element being parallel to but offset from the axis provided by the pivot element associated with the other of said sections when the sections are in said coplanar relation and being in alignment with the axis provided by the pivot element associated with the other of the sections when the sections are in said face-to-face relation, whereby the sections are foldable when the sections are in said face-to-face relation.

4. A collapsible automobile trailer in accord with claim 3 where the pivot elements of the hinge components are respectively located at the top and bottom of said frame.

5. A collapsible automobile trailer in accord with claim 3 and further comprising pivot means connecting the assembly with the frame and providing an axis for pivotal movement of the assembly between its frame supporting position and another position in the opening of the frame, and releasable means locking the wheel assembly in its frame supporting position.

6. A collapsible automobile trailer in accord with claim 3 and further comprising pivot means connecting the assembly to the hinge component of one of said sections and providing an axis for pivotal movement of the assembly between its frame supporting position and another position in the opening of the frame, and releasable means locking the wheel assembly in its frame supporting position.

7. A collapsible automobile trailer in accord with claim 3 further comprising pivot means connecting the assembly to the hinge component of one of said sections and providing an axis for pivotal movement of the assembly between its frame supporting position and another position in the opening of the frame, and releasable means locking the wheel assembly in its frame supporting position; and where the pivot element of the hinge component connected to the assembly is located at the top of said frame.

8. A collapsible automobile trailer comprising an elongated, generally rectangular, open frame which has opposite ends and is generally oriented in a horizontal plane, a caster wheel assembly in a frame supporting position at one of said ends, hitch means at the other of said ends for connecting the frame to an automobile, and means pivotally connecting the assembly to the frame so that the assembly can be pivotally moved between said supporting position and another position with respect to the frame; said frame including a pair of frame sections which are arranged in the horizontal plane and in general coplanar relation, and a pair of hinges which interconnect the sections and have means establishing an axis for pivotal movement of the sections into face-to-face relation; and each of said frame sections comprising a pair of elongated structural components which have adjacent ends and which have spaced ends that are remote from the adjacent ends and secured to the respective hinges, and a hinge component which interconnects the structural components at their adjacent ends and which has pivot means establishing an axis for pivotal movement of the structural components, the axis of said pivot means being parallel to but offset from the axis established by the pivot means associated with the other of the sections when the sections are in said coplanar relation and being in alignment with the axis established by the pivot means associated with the other of the sections when the sections are in said face-to-face relation, whereby the sections are simultaneously foldable when the sections are in said face-to-face relation.

References Cited

UNITED STATES PATENTS

| | | | |
|---|---|---|---|
| 2,254,437 | 9/1941 | Marney | 296—26 |
| 2,546,604 | 3/1951 | Zafky | 280—78 |

LEO FRAGLIA, Primary Examiner

R. S. SONG, Assistant Examiner

U.S. Cl. X.R.

280—78

PO-1050
(5/69)

UNITED STATES PATENT OFFICE
CERTIFICATE OF CORRECTION

Patent No. 3482850      Dated December 9, 1969

Inventor(s)    Harold J. Fay

It is certified that error appears in the above-identified patent and that said Letters Patent are hereby corrected as shown below:

Column 3, Line 39, should read -- end relation at the rear end of the frame as seen in FIGS. --.

SIGNED AND
SEALED
JUN 16 1970

(SEAL)
Attest:

Edward M. Fletcher, Jr.
Attesting Officer

WILLIAM E. SCHUYLER, JR.
Commissioner of Patents